United States Patent [19]

Leonard

[11] Patent Number: 4,980,708
[45] Date of Patent: Dec. 25, 1990

[54] PHOTOGRAPHIC CAMERA WITH HANDGRIP

[75] Inventor: Bruce A. Leonard, Honeoye Falls, N.Y.

[73] Assignee: Eastman Kodak Company, Rochester, N.Y.

[21] Appl. No.: 465,669

[22] Filed: Jan. 16, 1990

[51] Int. Cl.⁵ .............................................. G03B 17/00
[52] U.S. Cl. ....................................... 354/82; 354/219
[58] Field of Search ........................... 354/82, 219, 288

[56] References Cited

U.S. PATENT DOCUMENTS

| | | | |
|---|---|---|---|
| 4,075,642 | 2/1978 | Niggeloh | 354/82 |
| 4,451,130 | 5/1984 | Yan | 354/82 |
| 4,493,542 | 1/1985 | Ohmura et al. | 354/82 |
| 4,796,034 | 1/1989 | Leanard et al. | 354/145.1 |

Primary Examiner—Michael L. Gellner
Attorney, Agent, or Firm—Roger A. Fields

[57] ABSTRACT

A photographic camera and a handgrip are pivotally connected for swinging movement of the camera body relative to the handgrip about a viewing axis through front and rear viewfinder windows on the camera body. This arrangement advantageously enables the camera body to be oriented selectively for horizontal format or vertical format picture-taking without having to change one's grasp of the handgrip or remove one's eye from the vicinity of the rear viewfinder window.

6 Claims, 3 Drawing Sheets

PHOTOGRAPHIC CAMERA WITH HANDGRIP

CROSS-REFERENCE TO A RELATED APPLICATION

Reference is made to commonly assigned, copending application Ser. No. 168,813 entitled COMPACT CAMERA WITH FLASH UNIT, and filed Mar. 16, 1988 in the names Bruce A. Leonard, James S. Couch, and Robert W. Mervar now U.S. Pat. No. 4,796,034 issued Jan. 3, 1989.

BACKGROUND OF THE INVENTION

1. Field of the Invention

The invention relates generally to the field of photography, and more particularly to a camera having a handgrip which can be grasped to prevent unintended movement of the camera at the time of exposure.

2. Description to the Prior Art

No matter how good a camera may be or how accurately it has been made, it cannot yield really acceptable results if it moves during the exposure. Much of the poor definition obtained by amateur and professional photographers is caused by a slight movement of the camera during the time the shutter is open. Thus, it is well known to provide a camera with a handgrip that is grasped in order to hold the camera steady.

When taking a series of pictures with the camera first oriented for horizontal format picture-taking and then oriented for vertical format picture-taking, or vice-versa, it is known as disclosed in prior art U.S. Pat. No. 4,451,130 to use a handgrip that is pivotally mounted proximate one corner of the camera. The handgrip is pivoted selectively to two different positions relative to the camera in accordance with the orientation of the camera for horizontal or vertical format picture-taking. The problem, however, is that since the camera must be re-oriented in order to change the format the photographer must adjust his or her grasp of the handgrip and remove his or her eye from the rear viewfinder during movement of the camera to re-orient it. Consequently, the sequence of picture-taking may be substantially slowed.

THE CROSS-REFERENCED APPLICATION

The cross-referenced application discloses a compact camera including an elongate electronic flash unit that is mounted at the rear of the camera body, proximate a rear viewfinder window, for rotation generally about the viewfinder window. The flash unit is rotatable between a folded inoperative position within a recessed area of the camera body and an erect operative position sufficiently higher than the camera lens to substantially prevent red-eye during a flash exposure.

SUMMARY OF THE INVENTION

According to the invention, there has been devised a photographic camera and a handgrip that are pivotally connected for swinging movement of the camera body relative to the handgrip about the viewing axis through a viewfinder window on the camera body. This arrangement advantageously enables the camera body to be oriented selectively for horizontal format or vertical format picture-taking without having to change one's grasp of the handgrip or remove one's eye from the vicinity of the viewfinder window. Thus, the problem described above in connection with prior art U.S. Pat. No. 4,451,130 is avoided.

DETAILED DESCRIPTION OF THE PREFERRED EMBODIMENT

The invention is disclosed as being embodied preferably in a 35 mm still camera. Because the features of this type of still camera are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
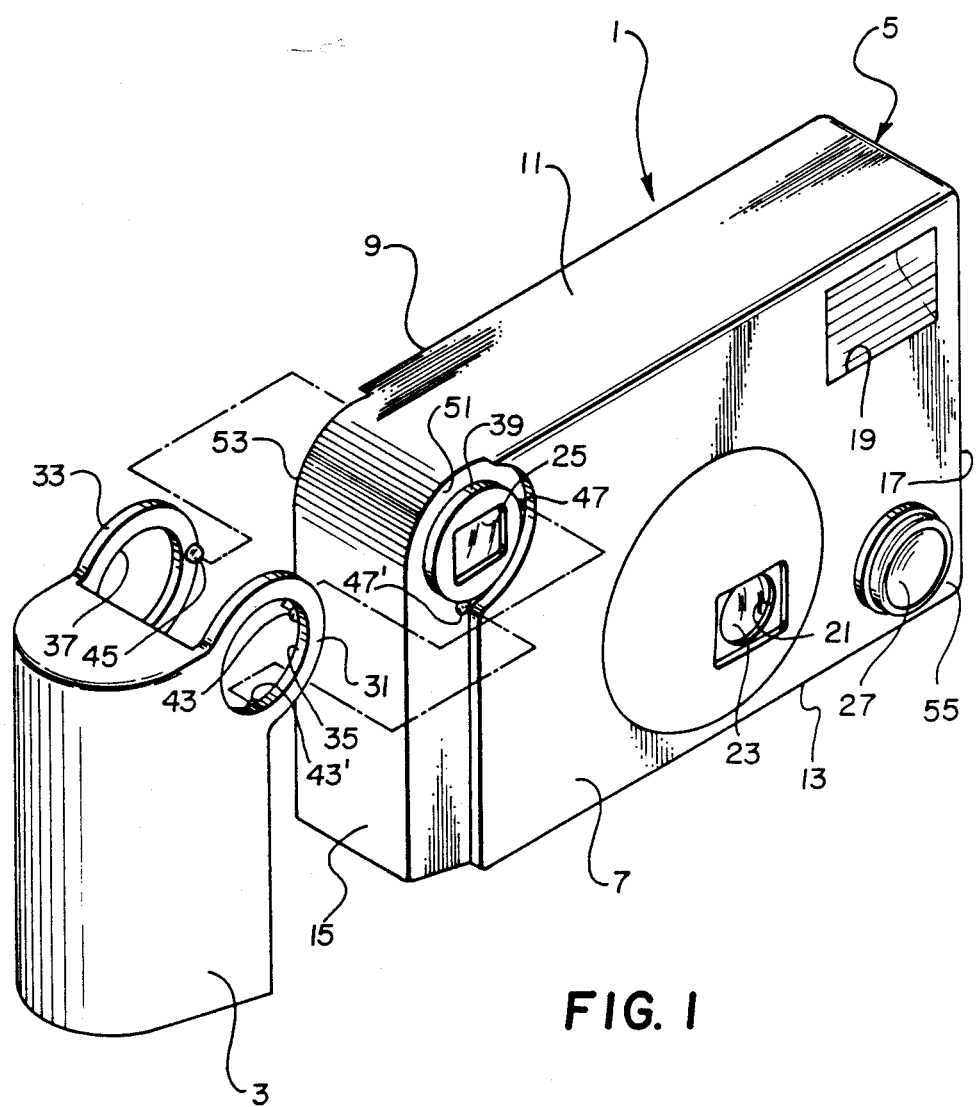
FIG. 1 is an exploded perspective view of a photographic camera and a handgrip according to a preferred embodiment of the invention.
Figure 2:
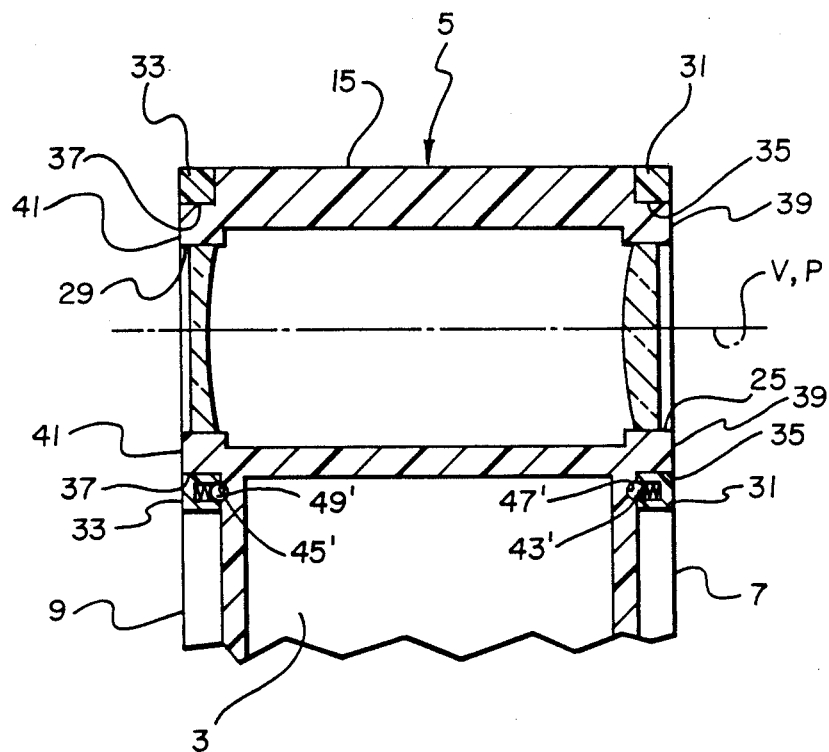
FIG. 2 is a sectional view of a pivotal connection between the camera body and the handgrip.

Referring now to the drawings, FIGS. 1 and 2 depict a photographic camera 1 and a handgrip 3. The photographic camera 1 comprises a camera body 5 having parallel front and rear faces 7 and 9, top and bottom substantially planar sides 11 and 13, and left and right substantially planar ends 15 and 17. Included on the front face 7 of the camera body 5 are a flash window 19 for a conventional built-in electronic flash, a window 21 for a taking lens 23, a front viewfinder window 25, and a manually depressible shutter release button 27. A rear viewfinder window 29 is included on the rear face 9 of the camera body 5, only as shown in FIG. 2. The two viewfinder windows 25 and 29 have a common viewing axis V, and as is commonly known are used to view a subject to be photographed.

Figure 3:
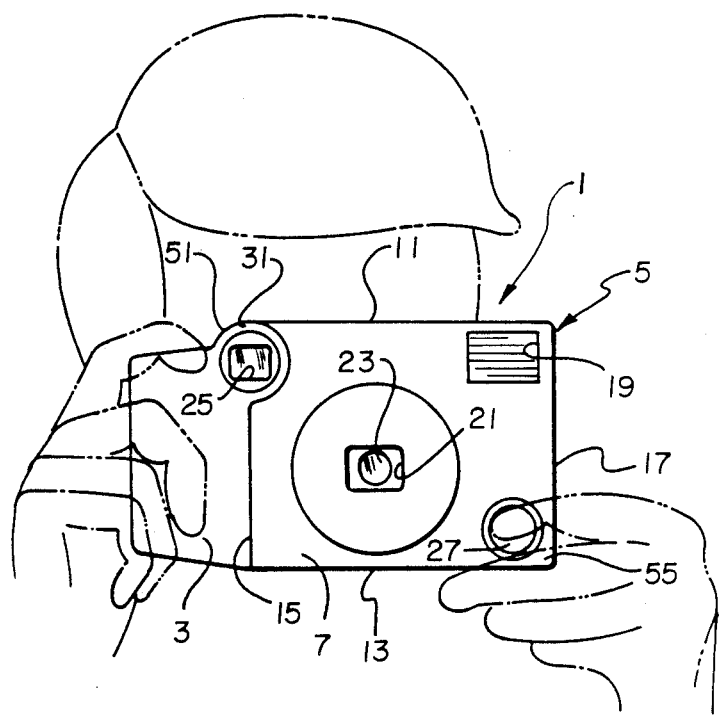
FIG. 3 is a front elevation view of the photographic camera and the handgrip, depicting the camera body oriented for horizontal format picture-taking.
Figure 4:
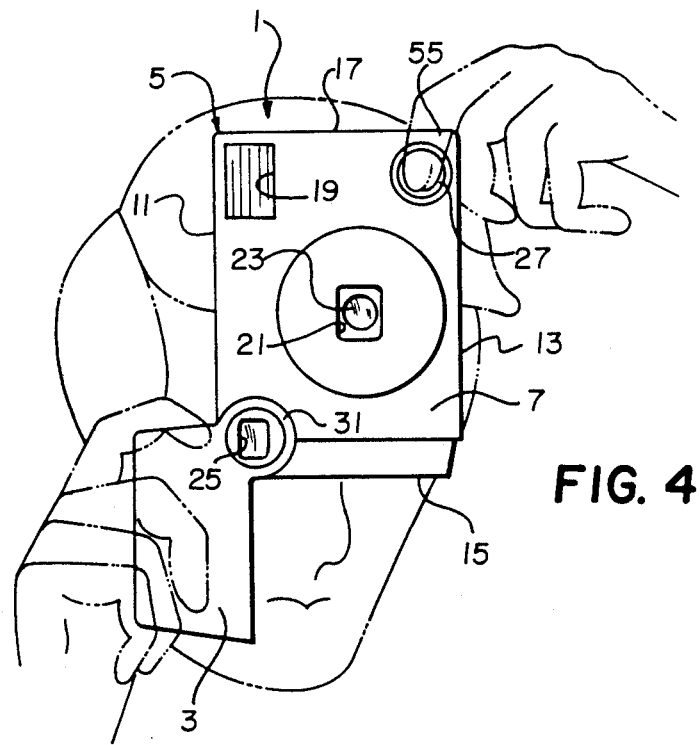
FIG. 4 is a front elevation view similar to FIG. 3 but depicting the camera body oriented for vertical format picture-taking.

The handgrip 5 includes front and rear ring-like coupling members 31 and 33 which define respective circular openings 35 and 37 that snugly receive separate disk-like frames 39 and 41 for the front and rear viewfinder windows 25 and 29. See FIGS. 1 and 2. The coupling members 31 and 33 cooperate with the window frames 39 and 41 to enable the camera body 5 to be manually swung about a pivot axis P disposed coaxially with the viewing axis V, when the handgrip 5 is grasped by the photographer in his right hand and he looks through the rear viewfinder window 29 with his right eye as shown in FIGS. 3 and 4. Thus, the camera body 5 can be selectively oriented for horizontal format picture-taking a depicted in FIG. 3 and for vertical format picture-taking as depicted in FIG. 4, without having to change one's grasp on the handgrip 5 or remove one's eye from the vicinity of the rear viewfinder window 29.

Suitable locking means is provided for releasably engaging the handgrip 3 and the camera body 5 to prevent any movement between the two, when the camera body is oriented for horizontal format or vertical format picture-taking. Preferably, such locking means comprises front and rear pairs of spring-urged steel balls 43, 43' and 45, 45', partially located in corresponding pockets in the front and rear coupling members 35 and 37, and front and rear pairs of semi-hemispherical recesses 47, 47' and 49' (only one shown) which alternatively receive the respective balls in accordance with the orientation of the camera body for horizontal format or vertical format picture-taking.

The front and rear viewfinder windows 25 and 29 are arranged proximate respective opposite upper front and rear corners 51 and 53 of the camera body 5. See FIG. 1. The shutter release button 27 is arranged proximate a lower front corner 55 of the camera body 5 that is diagonally distanced from the front viewfinder window 25. When the camera body 5 is oriented for horizontal format picture-taking, the handgrip 3 is disposed generally flush with the substantially planar end 15 of the camera body 5 as shown in FIG. 3. Otherwise, when the camera body 5 is oriented for vertical format picture-taking, the handgrip 3 extends substantially perpendicular from the planar end 15 of the camera body.

The invention has been described with reference to a preferred embodiment. However, it will be understood that variations and modifications can be effected by one having ordinary skill in the art without departing from the scope of the invention. For example, instead of the front and rear viewfinder windows 25 and 29, a single viewfinder window may be used. Also, the viewfinder window may take the known forms of an open frame, a glass window, etc.

According to another example, in place of the shutter release button 27 a concavity could be provided in the front face 7 of the camera body 5 to facilitate manually grasping the camera body to swing it about the pivot axis P. In this instance, the button 27 would be located elsewhere to prevent it from being inadvertently depressed.

I claim:

1. An improved photographic camera including a handgrip, wherein (a) a viewfinder window is provided on the camera body for viewing a subject to be photographed and (b) attachment means connects said handgrip and said camera body for movement of one relative to the other, and wherein the improvement comprises: said attachment means connects said handgrip and said camera body to enable the camera body to be manually swung about a pivot axis extending through said viewfinder window, when the handgrip is manually grasped and a subject is viewed through the viewfinder window, to selectively orient the camera body for horizontal format or vertical format picture-taking without having to change one's grasp of the handgrip or remove one's eye from the vicinity of the viewfinder window.

2. The improvement as recited in claim 1, wherein said attachment means connects said handgrip and said camera body to locate said pivot axis in coaxial relation with a viewing axis through said viewfinder window.

3. The improvement as recited in claim 1, wherein said attachment means includes a coupling member substantially surrounding said viewfinder window to connect said handgrip and said camera body at a corresponding location proximate the viewfinder window.

4. The improvement as recited in claim 1, further comprising:
locking means for releasably engaging said camera body and said handgrip to prevent any movement between the two, when the camera body is oriented for horizontal format or vertical format picture-taking.

5. The improvement as recited in claim 1, wherein said viewfinder window is arranged proximate an upper corner of said camera body, when the camera body is oriented for horizontal format picture-taking.

6. The improvement as recited in claim 5, wherein said handgrip is located generally flush with a substantially planar end of said camera body adjoining said upper corner of the camera body, when the camera body is oriented for horizontal format picture-taking, and the handgrip extends longitudinally from said substantially planar end of the camera body, when the camera body is oriented for vertical format picture-taking.

* * * * *